(12) United States Patent
Brigham et al.

(10) Patent No.: US 9,704,365 B2
(45) Date of Patent: Jul. 11, 2017

(54) HEAT DETECTOR

(71) Applicant: Sprue Safety Products Ltd., Coventry (GB)

(72) Inventors: Peter Brigham, Coventry (GB); Chris Bolger, Coventry (GB)

(73) Assignee: SPRUE SAFETY PRODUCTS LTD., Coventry (GB)

( * ) Notice: Subject to any disclaimer, the term of this patent is extended or adjusted under 35 U.S.C. 154(b) by 0 days.

(21) Appl. No.: 14/915,533

(22) PCT Filed: Aug. 21, 2014

(86) PCT No.: PCT/GB2014/052563
§ 371 (c)(1),
(2) Date: Feb. 29, 2016

(87) PCT Pub. No.: WO2015/033106
PCT Pub. Date: Mar. 12, 2015

(65) Prior Publication Data
US 2016/0240058 A1    Aug. 18, 2016

(30) Foreign Application Priority Data

Sep. 4, 2013 (GB) .................................. 1315698.9

(51) Int. Cl.
*G08B 17/00* (2006.01)
*G08B 17/06* (2006.01)
(Continued)

(52) U.S. Cl.
CPC ............ *G08B 17/06* (2013.01); *G01J 5/0205* (2013.01); *G01J 5/041* (2013.01); *G01J 5/0853* (2013.01);
(Continued)

(58) Field of Classification Search
CPC ........ G08B 17/00; G08B 17/06; G08B 17/10; G08B 19/00; G08B 19/005
See application file for complete search history.

(56) References Cited

U.S. PATENT DOCUMENTS 4,529,976 A    7/1985 Jameson et al.
5,584,579 A    12/1996 Asano et al.
(Continued)

FOREIGN PATENT DOCUMENTS

DE    102006048597 A1    4/2008
DE    202008017012 U1    4/2009
(Continued)

OTHER PUBLICATIONS

International Search Report issued by ISA/EP in connection with PCT/GB2014/052564 on Nov. 5, 2014.
(Continued)

*Primary Examiner* — Van Trieu
(74) *Attorney, Agent, or Firm* — Levenfeld Pearlstein, LLC

(57) ABSTRACT

A heat alarm apparatus includes a housing defining a body, a sensor mounting panel located on the body and a heat sensor extending from the sensor mounting panel. A control circuit is configured to detect a temperature rise at the heat sensor and output an alarm signal in response thereto. At least the surface of the sensor mounting panel from which the heat sensor extends is a dark color.

20 Claims, 14 Drawing Sheets

(51) Int. Cl.
*G08B 17/10* (2006.01)
*G01J 5/04* (2006.01)
*G01J 5/02* (2006.01)
*G01J 5/20* (2006.01)
*G01J 5/08* (2006.01)

(52) U.S. Cl.
CPC ............... *G01J 5/20* (2013.01); *G08B 17/00* (2013.01); *G08B 17/10* (2013.01)

(56) References Cited

U.S. PATENT DOCUMENTS

| | | | |
|---|---|---|---|
| 2003/0058116 A1 | 3/2003 | Mayusumi et al. | |
| 2005/0035868 A1* | 2/2005 | Back | G08B 17/113 340/627 |
| 2008/0018485 A1* | 1/2008 | Kadwell | G08B 17/107 340/630 |
| 2013/0020929 A1* | 1/2013 | van de Ven | H01L 25/0753 313/498 |
| 2013/0114242 A1* | 5/2013 | Pickard | F21V 9/16 362/84 |
| 2013/0201022 A1* | 8/2013 | Brigham | G08B 17/107 340/584 |

FOREIGN PATENT DOCUMENTS

| | | |
|---|---|---|
| DE | 202011105313 U1 | 11/2011 |
| GB | 2263778 A | 8/1993 |
| JP | 2001143174 A | 5/2001 |
| JP | 2002133550 A | 5/2002 |
| JP | 2002352346 A | 12/2002 |
| JP | 2005128871 A | 5/2005 |
| JP | 2006227746 A | 8/2006 |
| JP | 2011192244 A | 9/2011 |
| JP | 2012058945 A | 3/2012 |
| WO | 2012123796 A1 | 9/2012 |
| WO | 2015033107 A1 | 3/2015 |

OTHER PUBLICATIONS

United Kingdom Search Report issued by the IPO in connection with GB1315698.9 on Jan. 17, 2014.

Gent by Honeywell, Heat Detectors, website PDF, Jun. 25, 2012, United Kingdom http://web.archive.org/web/20120625171348/ http://www.gent.co.uk/products/conventional-fire-detection/Heat %20Dectectors/106/.

Firesupplies, Ziton Z620-771-3 Heat Conventional Heat Detector, website PDF, 2014, United Kingdom http://www.fire-supplies.co. uk/products/Ziton-Z620%252d771%252d3-Heat-Conventional-Heat-Detector.html International Search Report issued by ISA/EP in connection with PCT/GB2014/052563 on Dec. 9, 2014.

* cited by examiner

HEAT DETECTOR

This is a National Stage Application of International Patent Application No. PCT/GB2014/052563, filed Aug. 21, 2014, which claims the benefit of and priority to Great Britain (GB) Patent Application No. 1315698.9, filed Sep. 4, 2013, the entirety of which are incorporated fully herein by reference.

BACKGROUND

The present invention relates to a heat alarm device.

Heat alarm devices for sensing heat, for example from a fire, are well known in the art.

Typically such heat alarms comprise a body containing control and drive circuitry, a heat sensor extending from the body and a cage located around the heat sensor in a manner that allows free flow of air past the sensor. The cage is rigid and is typically made of such a size that it stands well clear of the sensor such that its thermal mass has minimum impact on the response of the sensor to a rise in ambient temperature.

The cage is necessary to present the heat sensor at a position removed from the large thermal mass of the electronics and body of the alarm, whilst also protecting the heat sensor from damage, and preventing the sensor (which will be attached to a source of electricity) being accidentally touched by anyone.

The sensor is generally centrally located so that the effect of the thermal mass of the body is substantially equal irrespective of the direction from which the heat originates (e.g. there is no heat shadow created by off-setting the sensor) and the protective cages are generally quite large relative to the sensor so that air can freely circulate around the sensor.

SUMMARY

According to a first aspect of the invention there is provided a heat alarm apparatus comprising: a housing defining a body, a sensor mounting panel located on said body, a heat sensor extending from said sensor mounting panel; and a control circuit configured to detect a temperature rise at the heat sensor and output an alarm signal in response thereto. At least the surface of the sensor mounting panel from which the heat sensor extends is a dark colour.

In a preferred arrangement the colour of the surface of the sensor mounting panel is either neutral, or has a hue ranging from purple to green, and has a value of 3 or less on the Munsell Colour System. More preferably the colour of said surface of the sensor mounting panel may have a value of 2 or less, or of 1 or less, on the Munsell Colour System.

By maintaining a dark colour for the surface the response time of the sensor to a change in heat of the environment in which it is placed, either radiated heat from a nearby heat source or of the air temperature, is increased so that the alarm can indicate a danger in a quicker response time.

The surface of the sensor mounting panel from which the heat sensor extends may optionally be provided with a plurality of embossed or impressed features thereon. The plurality of embossed or impressed features may comprise a plurality of pyramid shaped features extending from the surface or a plurality of pyramid shaped impressions extending into the surface, however other shapes may be used. As, in the case of a fire, the heat is likely to come from a specific direction, then having a plurality of angular shaped protrusions or recesses will increase the area of the mounting panel for which the angle of sight to the heat source, and therefore the angle of incidence of the radiated heat, is increased which will improve the heat absorption/radiation from the mounting panel. It is also believed that the surface features may increase heat transfer when air passes thereover. The effect is measureable and demonstrable and although the mechanics of the benefit described herein are believed to be accurate they have not been irrefutably proven and the effect may be for reasons other than those stated.

In one arrangement the sensor mounting panel may be concave. Again this is believed to assist with the reflected, radiated and absorbed heat, which together increase the speed at which the heat sensor registers a change in temperature. Additionally, having a concave sensor means that a greater portion of the reflected and radiated heat will be reflected/radiated in the direction of the heat sensor which is located substantially in the centre of the sensor mounting panel.

The sensor mounting panel comprises a moulding of a coloured plastic, or alternatively the sensor mounting panel may have a coloured coating (e.g. a paint) thereon.

A protective cage preferably extends from the housing and forms an enclosure between the protective cage and the sensor mounting panel, and the heat sensor is located in said enclosure. As the heat sensor extends from the mounting panel, and needs free air from the environment in which it is placed to circulate around it, the purpose of the cage is twofold. Firstly it protects the heat sensor from damage, and secondly it contributes to the electrical safety of the alarm by assisting in preventing fingers or the like from coming into contact with the sensor.

The sensor mounting panel may be recessed in the housing, this assists in contributing to the protection of the sensor therein.

According to a second aspect of the invention there is provided a heat sensing module for a heat alarm apparatus. The heat sensing module comprises: a sensor mounting panel; a heat sensor extending from said sensor mounting panel; and a control circuit configured to detect a temperature rise at the heat sensor and output an alarm signal in response thereto. At least the surface of the sensor mounting panel from which the heat sensor extends is a dark colour.

The colour of said surface of the sensor mounting panel is preferably the same as those described above in relation to the first aspect of the invention.

The surface of the sensor mounting panel from which the heat sensor extends may be provided with a plurality of embossed or impressed features thereon. The plurality of embossed or impressed features may comprise a plurality of pyramid shaped features extending from the surface or a plurality of pyramid shaped impressions extending into the surface.

The sensor mounting panel can be concave. The sensor mounting panel comprises a moulding of a coloured plastic, or alternatively the sensor mounting panel may have a coloured coating thereon.

Preferably a protective cage extends from said housing and forms an enclosure between said protective cage and said sensor mounting panel, and the heat sensor is located in said enclosure.

BRIEF DESCRIPTION OF THE DRAWINGS

Specific embodiments of the invention are described below, by way of example, with reference to the drawings, in which.

DETAILED DESCRIPTION

Figure 1:
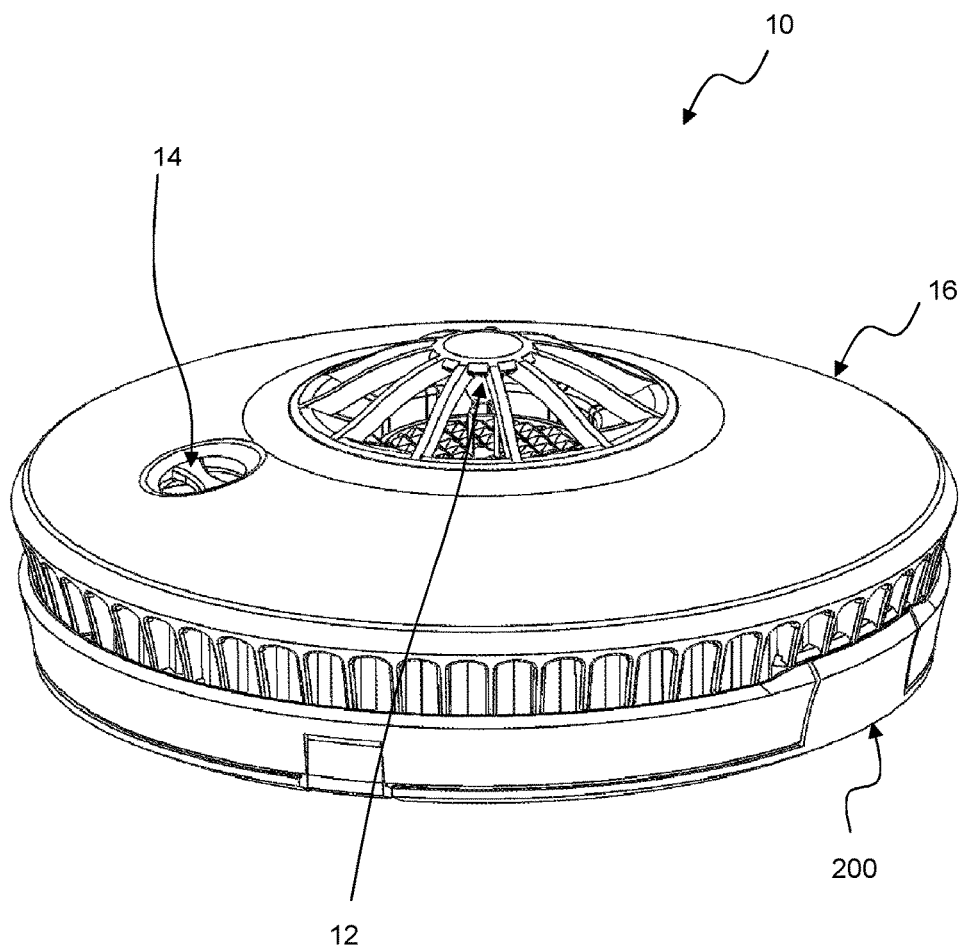
FIG. 1 shows a perspective view of a first embodiment of a heat alarm apparatus in accordance with the invention.
Figure 2:
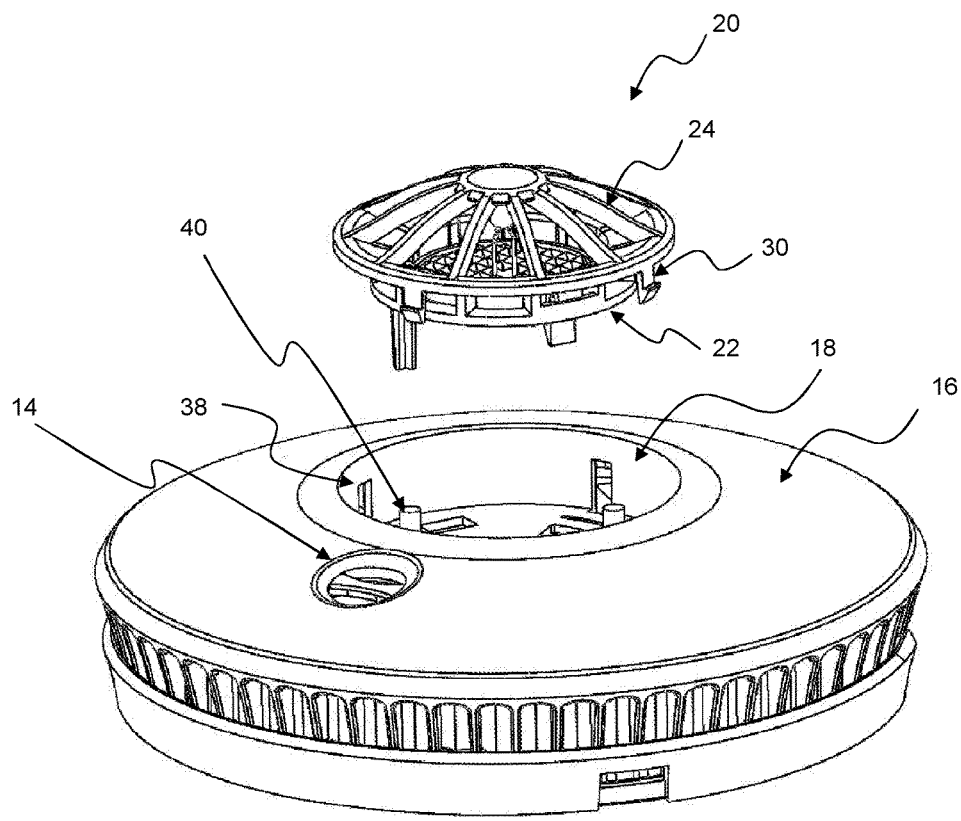
FIG. 2 shows a partially exploded view of the heat alarm of FIG. 1.
Figure 3:
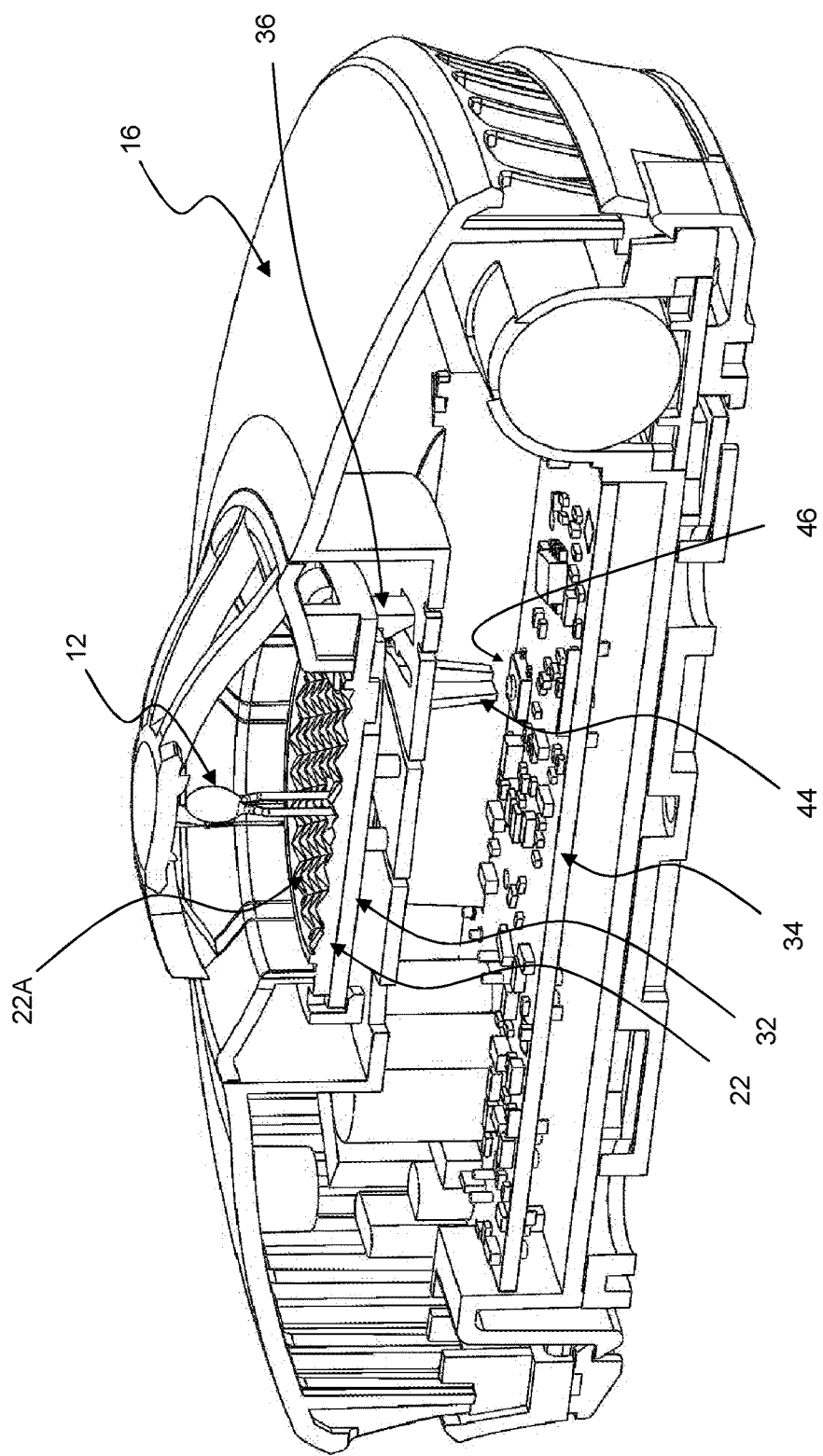
FIG. 3 shows a section view of the heat alarm of FIG. 1.
Figure 4:
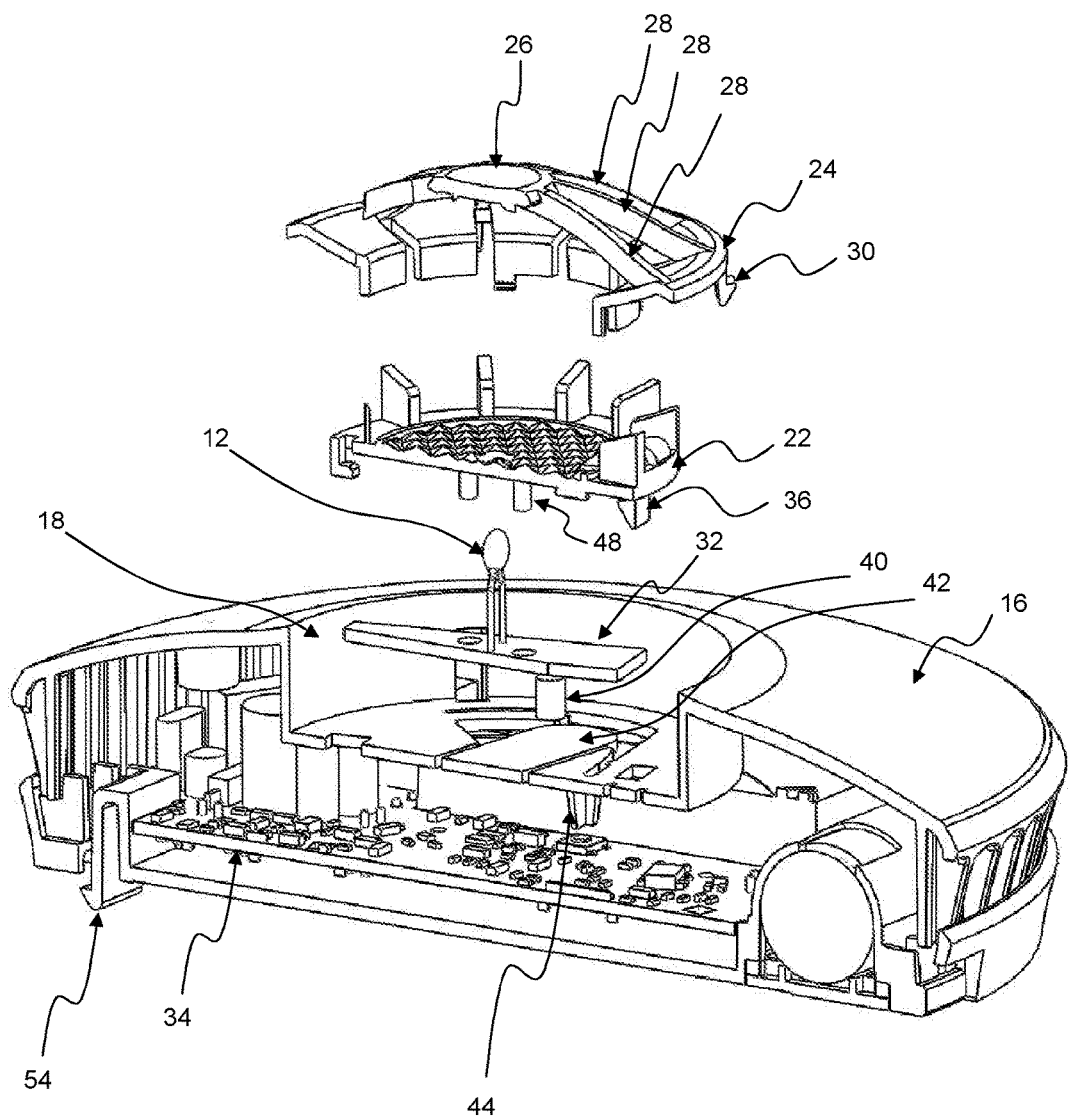
FIG. 4 shows an exploded section view of the alarm of FIG. 1.
Figure 5:
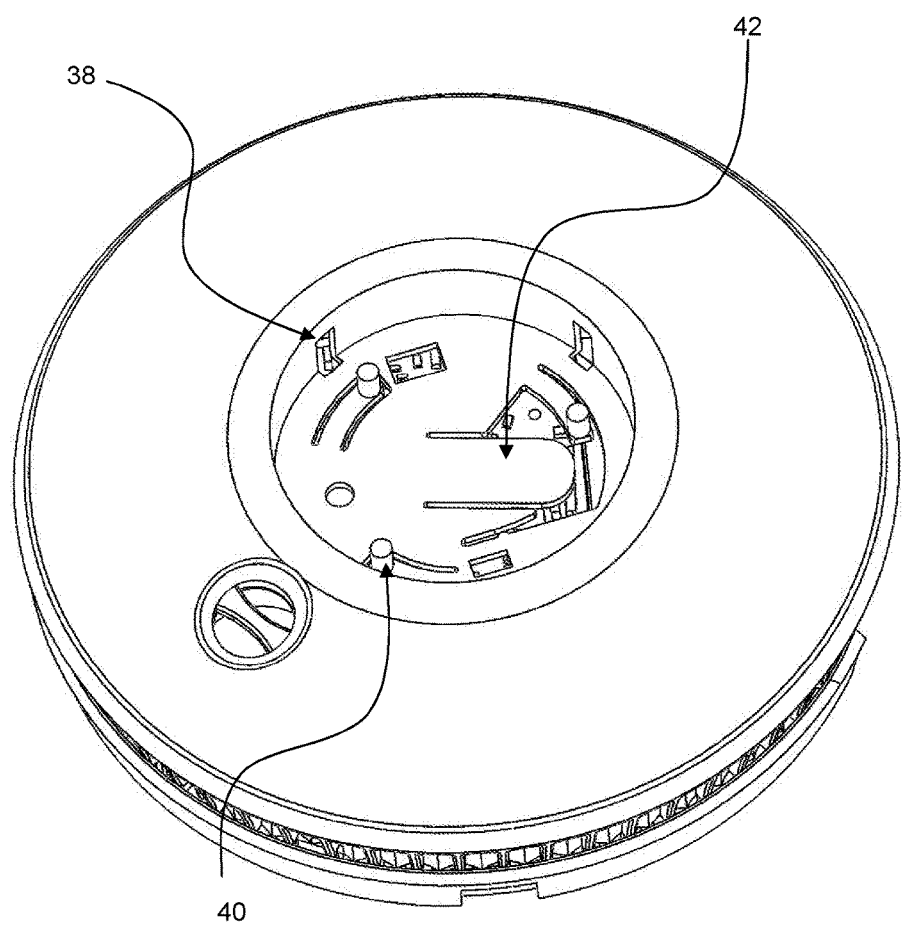
FIG. 5 shows a perspective view of the top of the alarm of FIG. 1 with the sensing module omitted.

Referring to FIGS. 1 to 9 a heat alarm apparatus 10 is shown. The heat alarm has a heat sensor 12, which is for example a thermistor that in use detects a change in the temperature of the environment in which the alarm apparatus is located and sounds an alarm via a speaker 14 to indicate a change in temperature. The alarm may be used for detecting a fire. The housing body 16 is attached to a base 300 (see FIG. 10).

The alarm has a body 16 that encloses electronic circuitry 34 for powering the sensor 12 and emitting an alarm via the speaker 14 in response to a detected heat change. The electronic circuitry can raise the alarm based on a predefined temperature being sensed, on a rate of temperature rise being sensed, a combination of the two, or any other temperature detection or change criteria known in the art and useful as an indicator of a fire.

The body 16 has a recess 18 in the middle in which a sensing module 20 is received. The sensing module has a base section 22 and a protection means 24 which together define an enclosure in which the sensor 12 is located. The base 22 has a hole therein through which the sensor 12 projects into the enclosure. The protection means 24 comprises a solid central part 26 which has a concave surface of around 2 cm in diameter, and a plurality of cage like ribs 28 extending therefrom to form a cage like structure.

In use air can freely pass between the ribs 28 so that the sensor 12 can detect changes in the air temperature.

The base section 22 and the protection means 24, or cage, clip together forming the enclosure, which is provided with spring clips 30 on its outer surface. Although shown attached to the protection means 24 it will be appreciated that the spring clips 30 may be provided on the base 22 without departing from the invention.

The spring clips 30 locate in channels 38 provided in the recess 18 in a manner that restricts maximum movement but allows for limited movement within the recess 18 in the direction of the channels 38.

The heat sensor 12 is attached to a circuit board 32, which clips to the bottom of the bottom of the base section 22 by clip 36 and forms part of the sensing module. The circuit board 32 forms part of the sensing module 20.

In this manner the entire sensing module 20 can slide in the recess 18. Springs 40 bias the sensing module into an outermost position in which the sensing module 20 is extended at a maximum position from the body 16 and wherein pressure on the protection means 24 in a direction towards the recess will cause the sensing module to move within the channels 38 against the bias of the springs.

The springs 40 comprise a small boss attached to a cantilever spring which is formed as part of the same plastics moulding as the body 16. Three springs 40 are positioned symmetrically in the recess 18 so that an even biasing force is provided on the sensing module 20, although it will be appreciated that different types or numbers of springs may be used providing that a sufficient biasing force is provided on the sensing module to return it to an extended position after deformation.

An interior surface 22A of the base 22 is provided with a surface texture thereon comprising a plurality of raised square based pyramids which increases the surface area of the base and in particular increases the angle at which radiant heat entering into the enclosure will impinge upon the interior surface 22A. This beneficially decreases the response time of the sensor 12 located within the sensing module.

At least the interior surface of the base 22 from which the heat sensor 12 extends is a dark colour. By dark it is meant that it's colour is either neutral (i.e. greyscale) or has a hue ranging from purple to green, and also that it has a value of 3 or less on the Munsell Colour System. The darker the colour the better the response so it will be appreciated that colours having a hue of 2, or 1 on the Munsell Colour System are preferable. In particular a black surface may be used. At least the interior surface of the base 22 may be painted a dark colour. Alternatively the base 22 may be moulded out of a dark, for example a black, polymer material. The effect of this is described below in relation to FIG. 6.

Also provided in the recess 18 is a button actuator leaf spring 42 which has an actuator extension 44 depending therefrom which is aligned so as to be positioned adjacent and spaced from a test/reset button 46 on the electronic circuitry 34.

The base section 22 of the sensing module 20 is provided with actuator fingers 48 which extend through the circuit board 32 so that when the sensing module is depressed against the springs 40 so that it moves towards the body 16, the actuator fingers 48 press on the button actuator leaf spring 42 which in turn deflects to press on the test/reset button 46.

In the embodiment described above the heat detector is provided with a large sensing module which includes the protection means or cage 24 to protect the heat sensor, and which large sensing module also doubles up as the test/reset button. This presents a large target for performing a test or reset of the device and as such is easily actuable by, for example, pressing it with a long stick, for example a broom handle or even a walking stick. The concave surface facilitates the pressing with a stick, which will often have a convex rounded end. This greatly facilitates the ease with which a person with restricted mobility can use the device as it reduces the necessity for the user to climb steps or a chair to reach the small offset test/reset button of previous designs. In addition, by using the sensing module as the test/reset button, a large button can be achieved without having to increase the size of the rest of the device and which enables a large button to be used without disturbing the alarm symmetry which is beneficial in reducing heat shadow effects that would occur if a similar style button were placed alongside the heat sensor of current designs of heat detector alarm apparatus.

Figure 6:
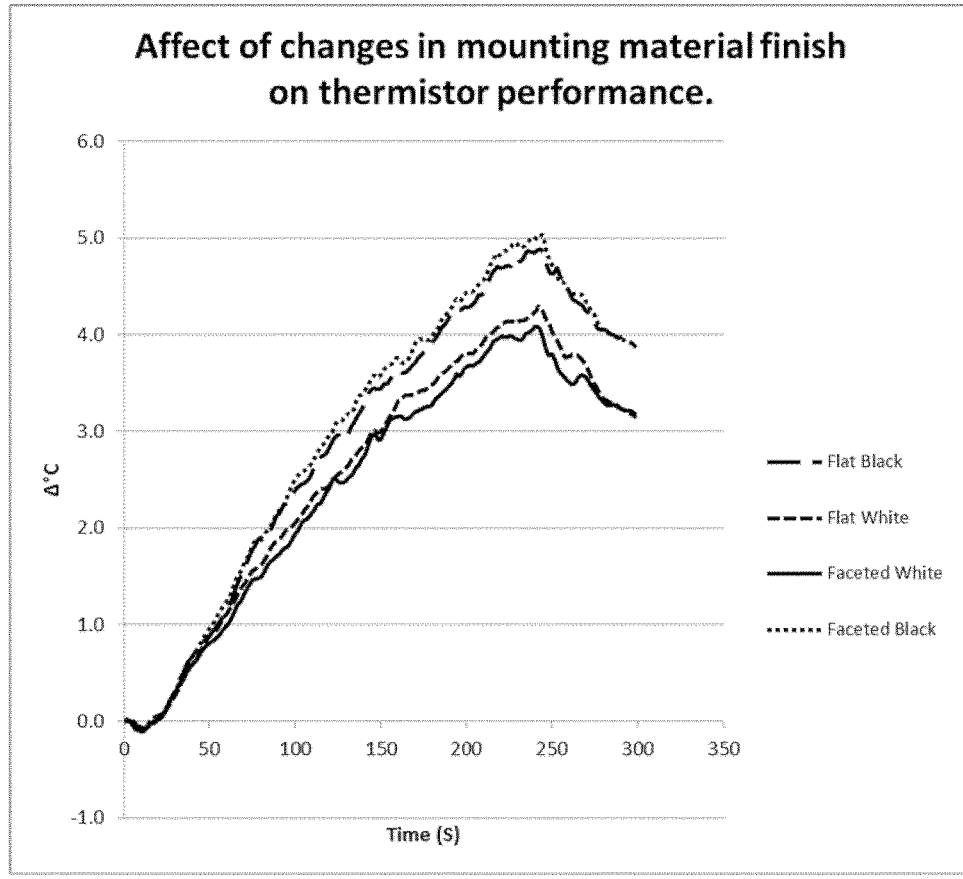
FIG. 6 shows the response times of the alarm of FIG. 1 with different specifications for the sensor mounting panel.
Figure 7:
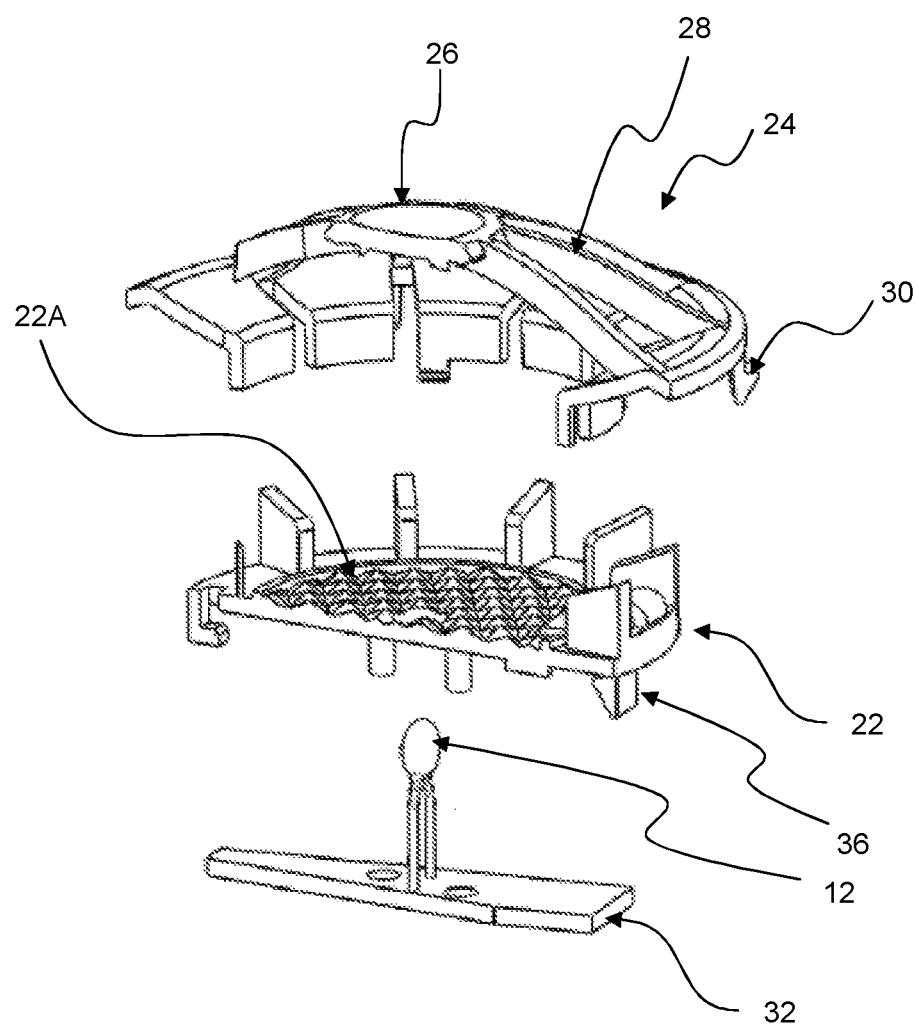
FIG. 7 shows an exploded section view of the heat sensing module in accordance with the second aspect of the invention.
Figure 8:
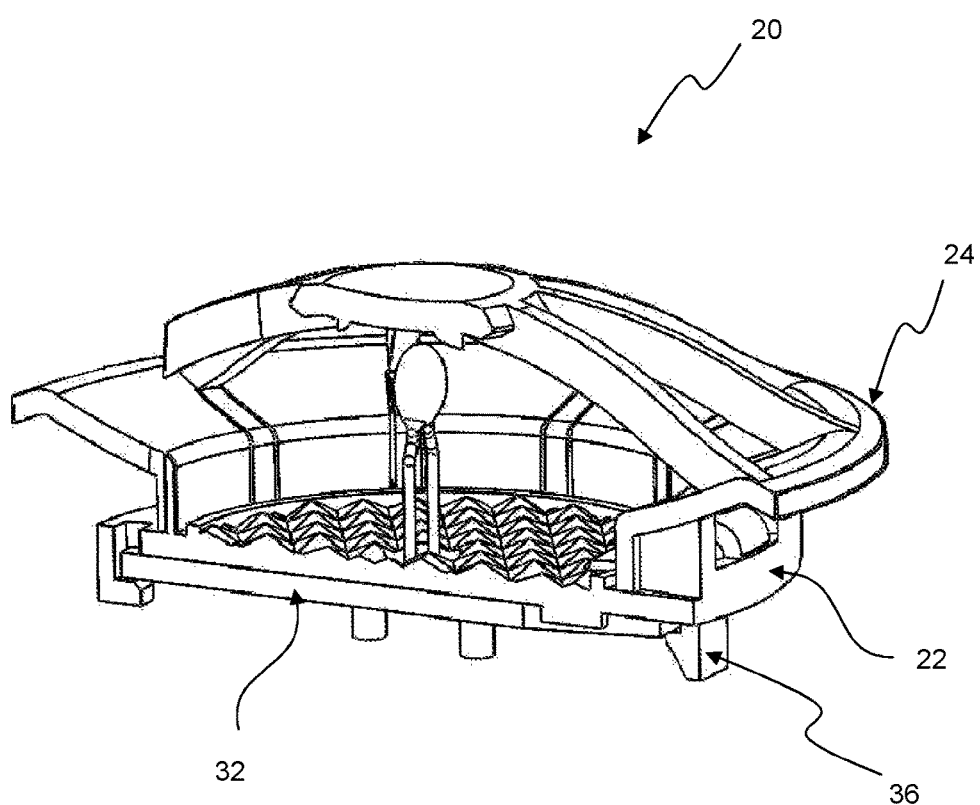
FIG. 8 shows a section view of the heat sensing module in accordance with the second aspect of the invention.
Figure 9:
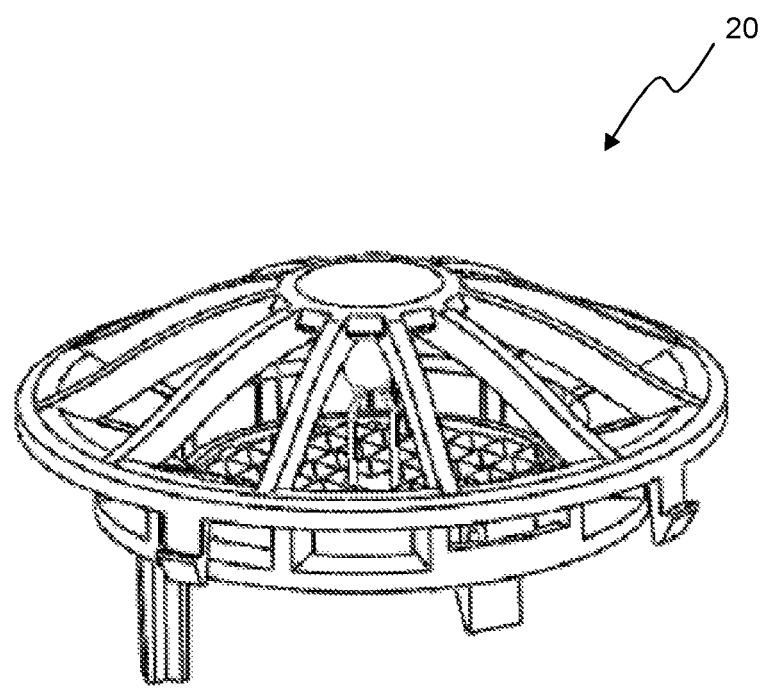
FIG. 9 shows a perspective view of the assembled heat sensing module in accordance with the second aspect of the invention.

In order to improve the performance of the heat detector 12 the side of the base section 22 facing the heat sensor 12 is provided with a surface texture that, in the example shown, comprises a plurality of shallow pyramids which in this embodiment are square based pyramids, although it will be appreciated that other surface textures or other pyramids having a different shaped base may be used. Although shown as a raised surface texture it will be appreciated that the features could also be other shapes, for example raised domes, or alternatively may be embossed into the surface. The surface of the pyramids is preferably a dark matt colour, for example matt black. It has been shown that using these geometries and using a dark matt surface can increase the response time of the temperature sensor as shown in FIG. 6. Under identical test conditions the temperature measured by the thermistor 12 was recorded over time as the external temperature was increased.

As clearly demonstrated both changing the colour of the surface of the base section 22 facing the thermistor 12 to a black colour and introducing a surface texture in the way of a faceted face increased the speed at which the sensor 12 was able to measure the increase in temperature. As will be appreciated, in detecting fire the response times of a system are very important and accordingly these features enable an increased response time.

Referring to FIGS. 11 to 14 a second embodiment 200 of the invention is shown. This embodiment differs from those shown in FIGS. 1 to 5 in that the sensing module 220 is mounted in the housing body 216 in a different manner. It will be appreciated that the parts shown in FIGS. 12, 13 and 14 only show one half of the body housing and in practice a lower part would also be provided to enclose the interior space of the alarm as shown in FIGS. 1-10.

Figure 14:
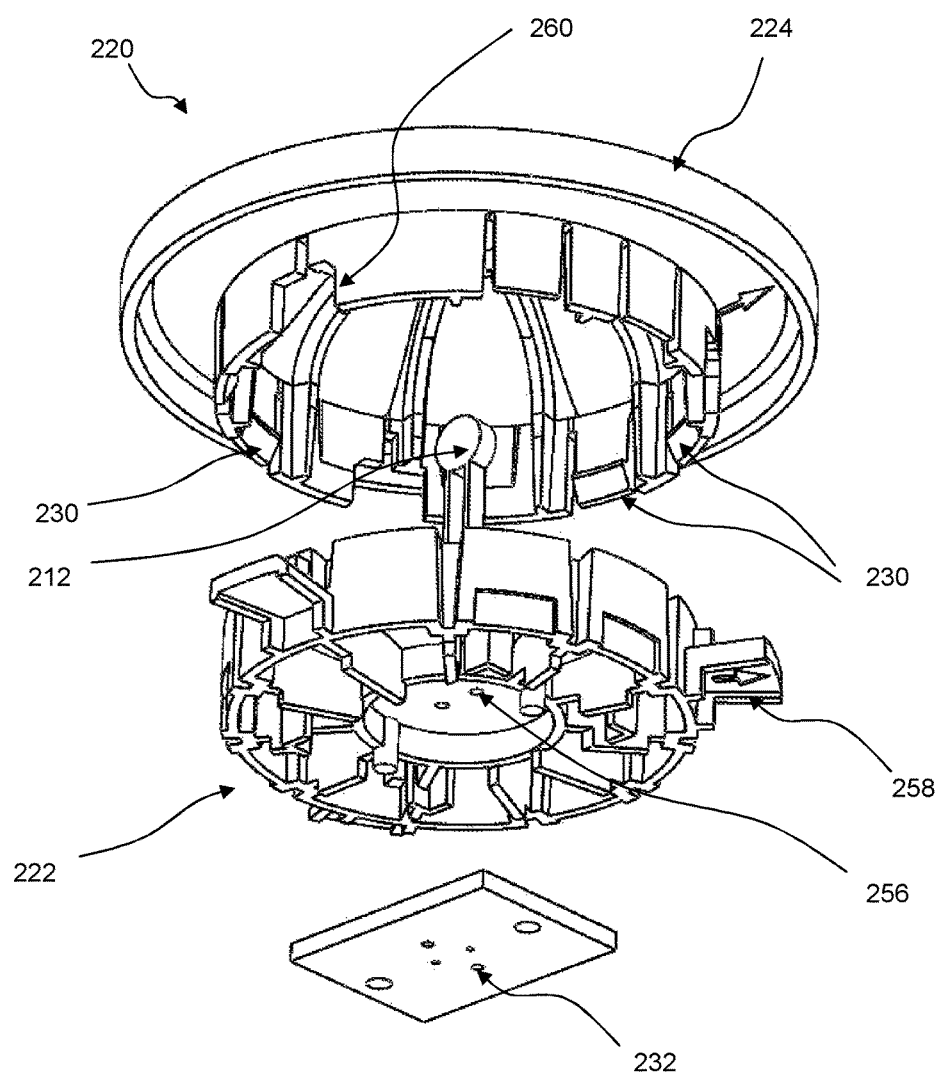
FIG. 14 shows an exploded view of the sensor button assembly of the second embodiment of the invention.

Referring first to FIG. 14 the sensing module 220 is shown which comprises four parts, a protective cage 224, a base section 222 that has thereon a concave reflective surface (see FIG. 11) which may optionally be provided with an array of surface features, for example square based prisms, a circuit board 232, and a heat sensor 212. The base section 222 is provided with one or more hole 256 through which electrical connectors of the heat sensor 212 can pass so that, when assembled, the sensing part of the heat sensor 212 is located in a space formed between the concave surface of the base section 222 and the protective cage or protection means 224, and the electrical connectors thereof pass through the holes 256 in the base section so that they can make electrical contact with the circuit board 232 on the other side thereof. Although shown and described as being concave it will be appreciated that a flat reflective surface could also be used as described in relation to the previous embodiments.

The base section has extensions 258 thereon which are received in recesses 260 of the protective cage 224 and locate the two parts in rotational alignment. The protective cage 224 has one or more spring clips 230 thereon that are resiliently displaced as the two parts are brought together and which spring back into position to retain the base section 222 when the parts are fully brought together. The protection means 224 comprises a solid central part 226 which has a concave surface of at least 2 cm diameter, and a plurality of cage like ribs 228 extending therefrom to form a cage like structure. These components together form the assembled sensor module 220.

Figure 12:
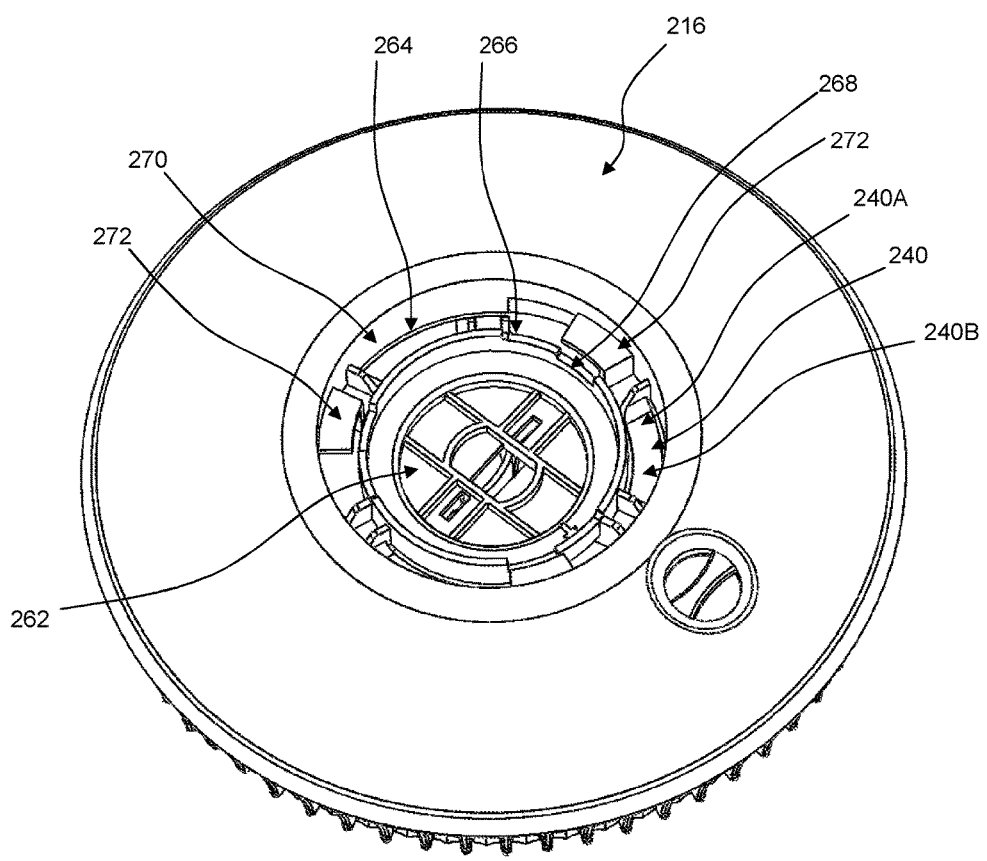
FIG. 12 shows a perspective view of the top of the housing body of the second embodiment of the invention.
Figure 13:
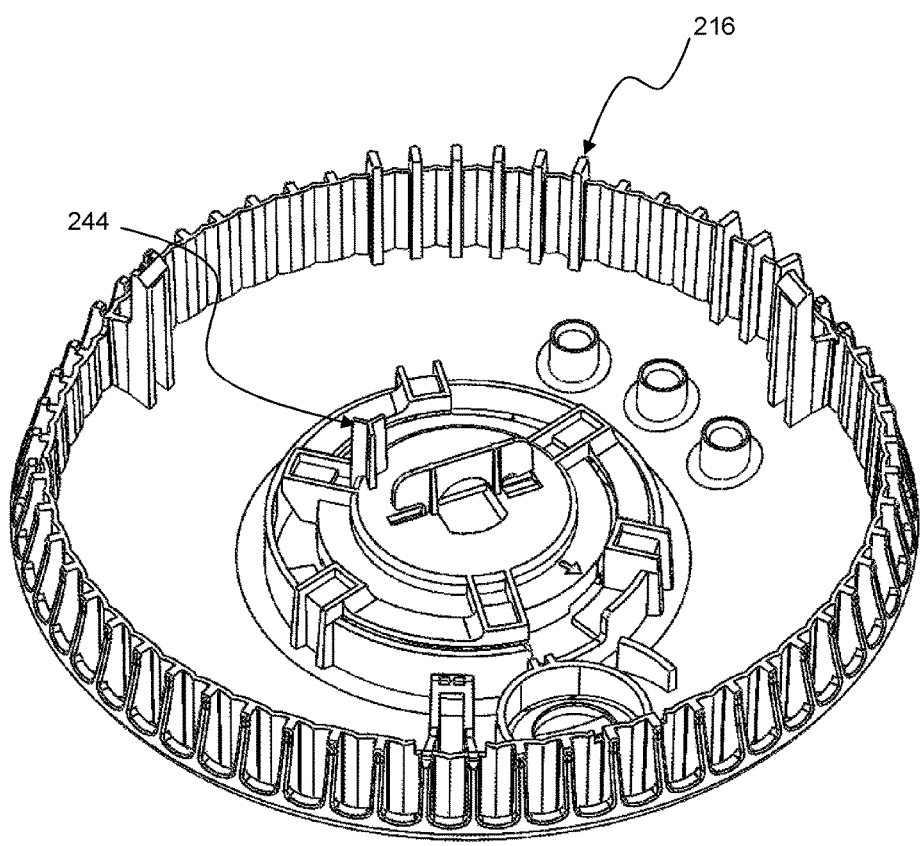
FIG. 13 shows a perspective view of the bottom of the housing body of the second embodiment of the invention.

Referring now to FIGS. 12 and 13 the housing body 216 has a recessed portion 218 which receives the sensing module 220. The recess has a lower surface 262 that is resiliently retained by the housing body 216 by a plurality of leaf type springs 240 located around the recessed portion 218, and which are each attached at one end 240A to the housing body 216 and at the other end 240B to the lower surface 262. In this manner the lower surface 262 is resiliently retained within the recess 218 in a manner such that a force applied thereto along the direction of the central axis of the recess will move the lower surface 262 in that direction, and when the moving force is removed the lower surface will resiliently return to its original position.

The lower surface 262 is circular and has a sidewall therearound. Spaced around the sidewall 264 are a number of stepped features at which the height of the sidewall is stepped down to a first reduced height 266 and is then further stepped down to a second reduced height 268. These stepped sections are spaced to coincide with the extensions 258 when the sensing module 220 is located in the recess 218. Aligned with the second step 266, and attached to the sidewalls 270, are a plurality of protrusions 272 located radially outside of, and adjacent to, the sidewall 264. In its natural position, i.e. the position in which the springs are not deformed, the vertical distance between top of the first stepped feature 266 and the lower surface of the protrusion 272 is less than the thickness of the extensions 258 of the sensing module 220.

To assemble the unit the sensor module 220 is inserted into the recess with the protrusions 258 aligned with the first recessed steps 266. The sensing module is then pressed into the recess to deform the springs 240 and thereby increase the vertical distance between the top of the first recessed steps 266 and the bottom surface of the protrusions 272 such that it is greater than the thickness of the extensions 258 of the sensing module 220. The sensing module 220 is then rotated to move the extensions 258 thereof in alignment with the second recessed steps 268, and is then released.

The sensing module 220 is therefore securely retained in the recess and cannot easily be removed without disassembling the heat detector.

As described in relation to the first and second embodiments the housing will contain electronic circuitry to power and control the alarm device. As can be seen in FIG. 13 a switch post 244 extends from the bottom of the lower surface 262 and operates in a similar manner to that described in relation to the extension 44 shown in FIG. 4, i.e. when the sensing module is pressed the extension 244 presses on a switch in a circuit board within the housing.

Figure 10:
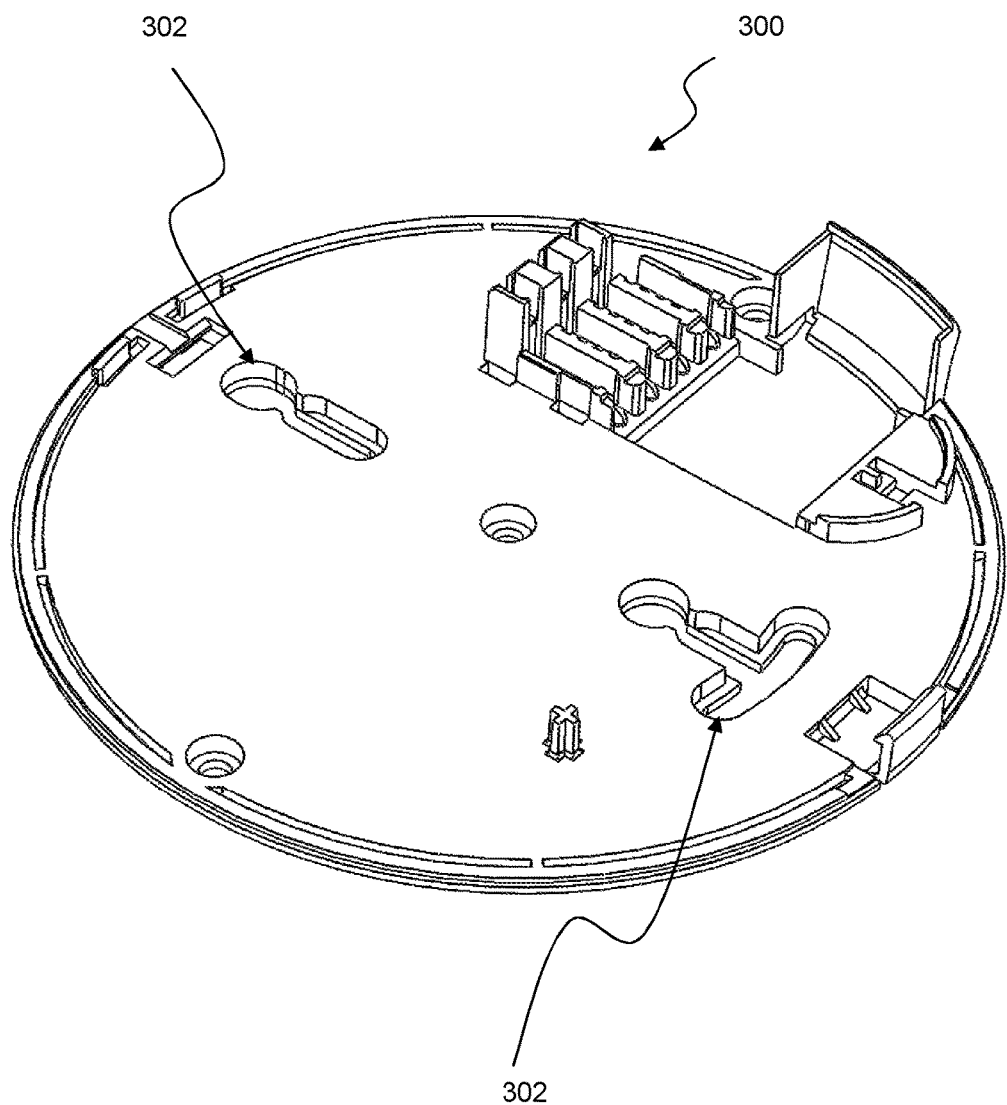
FIG. 10 shows a mounting plate for the alarm apparatus of the invention.
Figure 11:
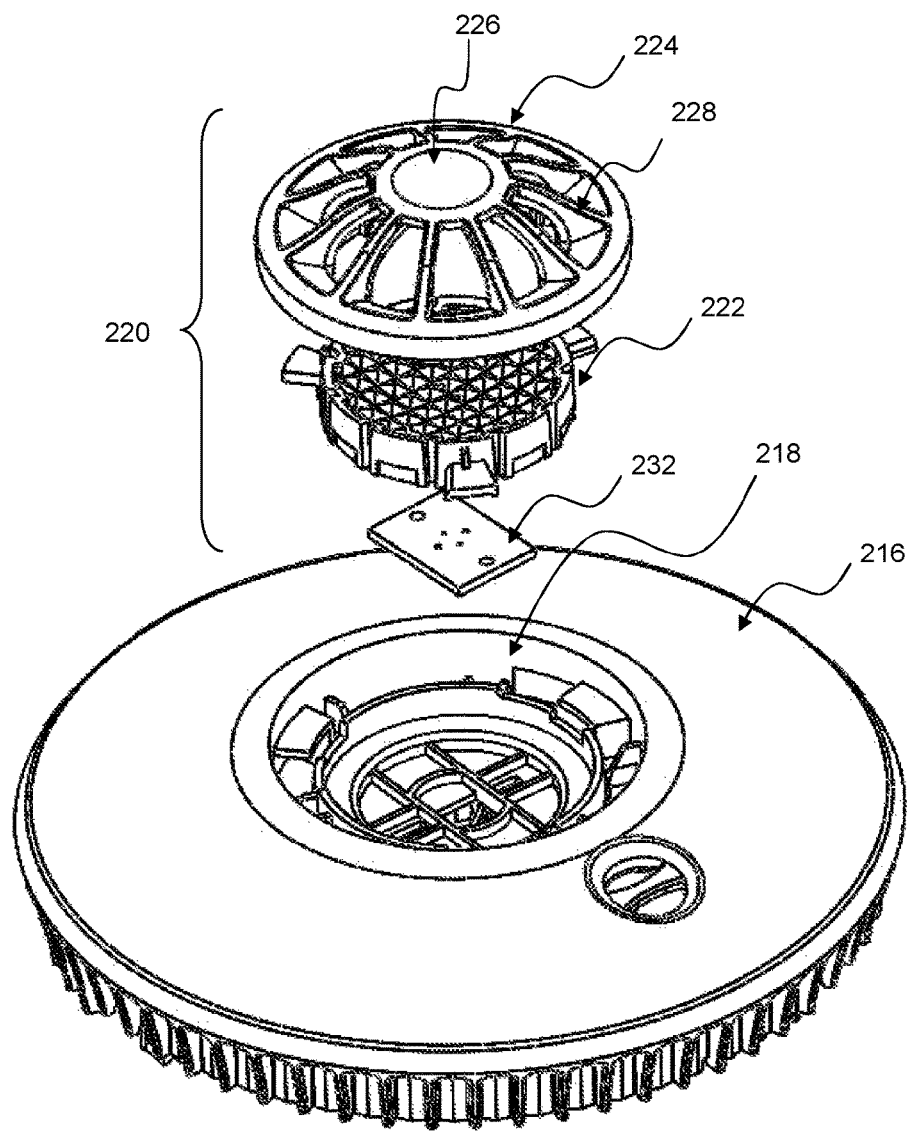
FIG. 11 shows an exploded view of a second embodiment of the first aspect of the invention.

All three embodiments of the invention will usually be attached to a ceiling in a property, although they may be attached to a wall. A mounting plate 300 as shown in FIG. 10 is shown. The mounting plate 300 is provided with fixing holes 302 by which it can be attached to a wall or other surface, and the alarm is provided with clips 54, 154 by which it is attached to the mounting plate 300.

The invention claimed is:

1. A heat alarm apparatus comprising:
   a housing defining a body;
   a sensor mounting panel located on said body;
   a heat sensor extending from said sensor mounting panel; and
   a control circuit configured to detect a temperature rise at the heat sensor and output an alarm signal in response thereto;
   wherein at least the surface of the sensor mounting panel from which the heat sensor extends is a dark color and is provided with a plurality of angular shaped protrusions or recesses thereon.

2. The heat alarm apparatus according to claim 1, wherein the color of said surface of the sensor mounting panel is either neutral, or has a hue ranging from purple to green, and has a value of 3 or less on the Munsell Color System.

3. The heat alarm apparatus according to claim 2, wherein the color of said surface of the sensor mounting panel has a value of 2 or less on the Munsell Color System.

4. The heat alarm apparatus according to claim 3, wherein the color of said surface of the sensor mounting panel has a value of 1 or less on the Munsell Color System.

5. The heat alarm apparatus according to claim 1, wherein the surface of the plurality of angular shaped protrusions or recesses comprises embossed or impressed features.

6. The heat alarm apparatus according to claim 5, wherein said plurality of embossed or impressed features comprises a plurality of pyramid shaped features extending from the surface or a plurality of pyramid shaped impressions extending into the surface.

7. The heat alarm apparatus according to claim 1, wherein said sensor mounting panel is concave.

8. The heat alarm apparatus according to claim 1, wherein the sensor mounting panel comprises a moulding of a colored plastic.

9. The heat alarm apparatus according to claim 1, wherein the sensor mounting panel has a colored coating thereon.

10. The heat alarm apparatus according to claim 1, further comprising a protective cage extending from said housing and forming an enclosure between said protective cage and said sensor mounting panel, and wherein said heat sensor is located in said enclosure.

11. The heat alarm apparatus according to claim 1, wherein the sensor mounting panel is recessed in said housing.

12. A heat sensing module for a heat alarm apparatus, the heat sensing module comprising:
    a sensor mounting panel;
    a heat sensor extending from said sensor mounting panel; and
    a control circuit configured to detect a temperature rise at the heat sensor and output an alarm signal in response thereto;
    wherein at least the surface of the sensor mounting panel from which the heat sensor extends is a dark color and is provided with a plurality of angular shaped protrusions or recesses thereon.

13. The heat sensing module according to claim 12, wherein the color of said surface of the sensor mounting panel is either neutral, or has a hue ranging from purple to green, and has a value of 4 or less on the Munsell Color System.

14. The heat sensing module according to claim 13, wherein the color of said surface of the sensor mounting panel has a value of 3 or less on the Munsell Color System.

15. The heat sensing module according to claim 14, wherein the color of said surface of the sensor mounting panel has a value of 2 or less on the Munsell Color System.

16. The heat sensing module according to claim 12, wherein the plurality of angularly shaped protrusions or recesses comprises embossed or impressed features.

17. The heat sensing module according to claim 16, wherein said plurality of embossed or impressed features comprises a plurality of pyramid shaped features extending from the surface or a plurality of pyramid shaped impressions extending into the surface.

18. The heat sensing module according to claim 12, wherein said sensor mounting panel is concave.

19. The heat sensing module according to claim 12, wherein the sensor mounting panel comprises a moulding of a colored plastic.

20. The heat sensing module according to claim 12, wherein the sensor mounting panel has a colored coating thereon.

* * * * *